United States Patent [19]

Angenent et al.

[11] Patent Number: 4,895,585
[45] Date of Patent: Jan. 23, 1990

[54] METHOD OF MANUFACTURING LENS ELEMENTS

[75] Inventors: Johannes H. Angenent, Paris, France; Nicodemus Hattu, Eindhoven, Netherlands; Petrus Heller, Eindhoven, Netherlands; Petrus A. Lemmens, Eindhoven, Netherlands; Cornelis J. T. Potters, Eindhoven, Netherlands; Johan C. Wijn, Eindhoven, Netherlands

[73] Assignee: U.S. Philips Corp., New York, N.Y.

[21] Appl. No.: 241,636

[22] Filed: Sep. 8, 1988

[30] Foreign Application Priority Data

Sep. 16, 1987 [NL] Netherlands ............ 8702201

[51] Int. Cl.$^4$ .............................................. C03B 11/08
[52] U.S. Cl. ........................................ 65/39; 65/59.4; 65/64; 264/2.7; 425/808
[58] Field of Search ............. 425/808; 65/37, 39, 65/59.4, 64; 264/1.1, 2.7

[56] References Cited

U.S. PATENT DOCUMENTS 2,410,616 11/1946 Webb .
4,591,373 5/1986 Sato ............................................. 65/29

OTHER PUBLICATIONS

"Archiv Fur Elektronik und Übertragungstechnik" (AEU), vol. 34, pp. 385–393, No. 10, Oct. 1980.

Primary Examiner—Robert L. Lindsay
Attorney, Agent, or Firm—William L. Botjer

[57] ABSTRACT

A method of manufacturing lens elements, in which a glass preform heated to the softening temperature and an annular metal holder (3) enclosing the glass preform are arranged between the heated moulding dies (7,9) of a mould and are moulded in a pressing step into a lens element comprising a glass lens (21) and a ring (3) enclosing the glass lens and acting as a fitting. During moulding, the ring 3 forms together with the two dies (7,9) a quasi closed moulding cavity having an annular gap (15). During moulding, the ring (3) is expanded radially and a quantity of glass is pressed.

6 Claims, 2 Drawing Sheets

METHOD OF MANUFACTURING LENS ELEMENTS

BACKGROUND OF THE INVENTION

The invention relates to a method of manufacturing lens elements comprising a glass lens and a metal holder, in which a glass preform is heated together with a metal holder to the processing temperature of the glass, the heated glass preform and the holder are arranged between the heated dies of a mould, which dies have a profile corresponding to the profile of the glass lens to be formed, the two dies are then moved toward each other in a pressing stroke, the glass preform is moulded in the holder into a glass lens, a quantity of glass being pressed away during the moulding operation and the composite lens element thus obtained consisting of glass lens and holder is finally cooled.

Such a method is known from U.S. Pat. No. 4,398,935. Due to the fact that in this known method a quantity of glass is pressed away from between the dies, the maximum inner moulding pressure is limited.

SUMMARY OF THE INVENTION

The invention has for its object to provide a method, which permits of increasing the accuracy of the shape of the moulded products and of improving their surface quality.

According to the invention, this object is mainly achieved in that the holder is constituted by a ring surrounding the glass preform and which defines during the moulding operation together with the two dies a quasi closed moulding cavity with an annular gap in such a manner that during moulding the ring is expanded radially.

By expansion of the ring, a comparatively high inner moulding pressure is built up, as a result of which surface and shape errors are prevented. The annular gap has a comparatively small height of the order of a few tenths of a millimeter so that the gap has only a minor influence on the inner moulding pressure and a quasi closed moulding cavity is obtained, in which event a pressure can be built up which is sufficiently high, a relatively small quantity of glass being pressed away through the gap. By the method according to the invention products can be manufactured the shape of which corresponds within very narrow tolerances to the profile of the dies.

The metal ring may be expanded only to a certain extent in the radial direction and may for this purpose be thick-walled. However, since the ring will adhere to the glass and may remain permanently connected to the moulded glass lens to serve, for example, as a mount, a comparatively thick-walled ring is often not appropriate and therefore undesirable. In a preferred embodiment of the method according to the invention, this disadvantage is obviated in that the expansion of the ring is limited by a supporting ring. This supporting ring serves as a temporary abutment and can be made thick-walled, while the ring itself may be comparatively thin and may have a wall thickness of 0.10 to 0.20 mm. At the same time, by this measure the reproducibility of the process is improved.

Another preferred embodiment of the method according to the invention is characterized in that the ring is made of nickel. Nickel does not oxidize rapidly, has an expansion coefficient of $13 \cdot 10^{-6} K^{-1}$ which does not deviate too strongly from that of most optical glasses varying from 5 to $15 \cdot 10^{-6} K^{-1}$ and has a relatively high modulus of elasticity so that the ring is easily deformable. Such a ring can readily shrink with the glass during cooling so that the formation of cracks in the moulded product is avoided despite the fact that glass readily adheres to nickel.

The moulding dies can be made of any suitable material. Experiments have shown that satisfactory results are obtained with dies of Ni-Cr steel. However, a further preferred embodiment of the method according to the invention is characterized in that a mould is used the dies of which are made of quartz glass at least on the moulding surface. Due to the comparatively low heat-conducting coefficient of quartz glass, the glass cools less rapidly by contact with the dies and the moulding process can be more readily controlled. Furthermore, a lower temperature of the dies suffices.

It should be noted that the use of a mould of quartz glass for moulding glass articles is known per se from U.S. Pat. No. 4,391,622.

Another preferred embodiment of the method according to the invention of manufacturing planar lens elements is characterized in that a disk-shaped glass preform is used, in that a ring is used having a cylindrical wall portion, in that the glass preform and the ring are arranged in a mould, one of whose dies has a geodesic profile, and in that the glass preform is moulded within the ring to form a composite planar lens element consisting of a disk-shaped glass lens having on one side a geodesic structure and a ring enclosing the glass lens.

Experiments have shown that with the method according to the invention planar lens elements having a high accuracy to shape and having a high surface quality can be manufactured in a reproducible manner. Such lens elements serve as a substrate for geodesic lenses for wave guide optics, both of multi- and monomode type, after further machining and processing and in combination with optical fibres.

A planar geodesic lens can be obtained in that the disk-shaped glass is provided with a light-conducting layer, by subjecting the glass lens to an ion exchange process or by applying a glass film having a refractive index slightly exceeding that of the glass lens, in which case a glass preform is used in the form of a packet or sandwich comprising two layers. Such planar geodesic lenses are described more fully in the article: "Geodesic Components for Guided Wave Optics" in: "Archiv für Elektronik und Übertragungstechnik" (AEÜ), Vol. 34, No. 10, Oktober 1980, pp. 385-393.

An additional build-up of the inner moulding pressure can be obtained in another preferred embodiment of the method according ot the invention in that a mould is used of which the other die has a convex profile and by means of which a concave profile is provided on the other side of the glass lens remote from the geodesic structure.

A further preferred embodiment of the method according to the invention is characterized in that during moulding guide elements are formed on the side of the glass lens provided with the geodesic structure. Due to this measure, the later coupling of optical fibres is simplified, said guide elements acting as positioning means for the fibres. The guide elements can be provided in the form of grooves, ribs, ridges, embossed parts and the like. For this purpose, the die, which is provided with a geodesic profile, is provided with corresponding recesses or embossed parts. By means of these guide elements, the optical fibres to be coupled can be positioned in the correct position with respect to the geodesic lens and can be glued thereto.

A lens element manufactured by the method according to the invention is characterized by a glass lens and an annular metal mount surrounding the glass lens. The metal mount is constituted by the ring, which adheres to the glass.

A planar lens element manufactured by the method according to the invention is characterized by a disk-shaped glass lens, which comprises on one side a geodesic structure and which is enclosed by an annular metal mount. During moulding the glass and the ring constituting the mount have adhered to each other.

The invention will be described more fully with reference to the drawing. In the drawing.

DETAILED DESCRIPTION OF THE PREFERRED EMBODIMENTS

Figure 1A:
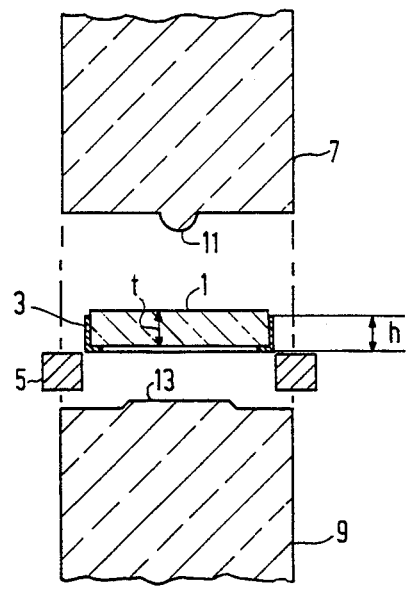
FIGS. 1A, 1B and 1C show the moulding process in successive steps.

FIG. 1A shows a glass preform 1, which is arranged in a thin-walled metal ring 3 serving as a holder. The diameters of the glass preform and the holder are practically equal and are proportioned so that the glass preform fits with a narrow tolerance within the ring. The thickness t of the glass preform 1 exceeds the height h of the ring 3. Reference numeral 5 designates a comparatively thick metal supporting ring, of which the inner diameter exceeds the outer diameter of the ring 3. FIG. 1A further shows in the rest position an upper die 7 and a lower die 9 of a mould not shown further.

The upper die 7 is provided with a convex rotation-symmetrical embossed part 11, while the lower die has a disk-shaped convex profile 13. The ring 3 is made of nickel, while the supporting ring 5 is made of Cr steel and the dies 7 and 9 are made of quartz glass or of Ni-Cr steel.

Figure 1B:
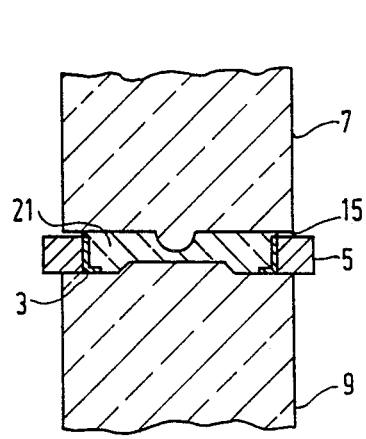

For the manufacture of a lens element, the glass preform 1 is heated together with the ring 3 and the supporting ring 5 to the processing temperature of the glass. The processing temperature is that temperature at which the glass has on the one hand a lowest possible viscosity and on the other hand does not yet adhere to the tool. Subsequently, the glass preform 1, the ring 3 and the supporting ring 5 are positioned between the heated dies 7 and 9. Ultimately, the two dies are moved towards each other with a given force in a pressing stroke until a given inner moulding pressure is built up in the glass mass and the two dies come to a standstill in the pressing position shown in FIG. 1B, the glass preform 1 being moulded into the desired shape. A narrow annular gap 15 of about 0.1 to 0.2 mm is left between the upper die 7 and the upper edge of the holder 3 which engages the lower die 9 with its lower side. In the moulding position shown in FIG. 1B, the ring 3 constitutes together with the dies 7 and 9 a moulding cavity, which is not completely closed in view of the gap 15, it is true, but which, in view of the narrow dimensions of the gap, is quasi closed. As soon as the dies get into contact with the glass, the glass is pressed and the pressure begins to build up in the glass mass. The holder 3 is expanded radially until it gets into contact with the supporting ring 5. Excessive glass can be pressed away through the gap 15. In view of the narrow dimensions of the gap, the pressure build-up is not influenced thereby.

Figure 1C:
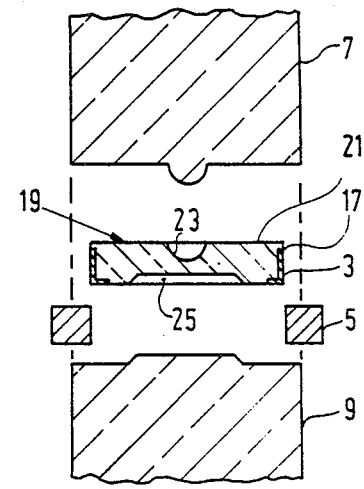

FIG. 1C shows the situation after cooling of the moulded product, the dies 7 and 9 being again in the rest position. The manufactured lens element 19 consists of the profiled glass lens 21 and the ring 3, which adheres thereto and which can act as a mount. The glass lens 21 is provided on one side with a concave geodesic structure 23 and on the other side with a flat depression 25. The glass pressed away through the gap 15 forms an annular collar 17 on the product.

Figure 2A:
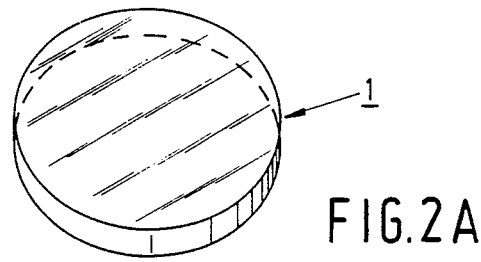
FIGS. 2A, 2B and 2C show the glass preform, the metal holder and the moulded lens element in perspective view.
Figure 2B:
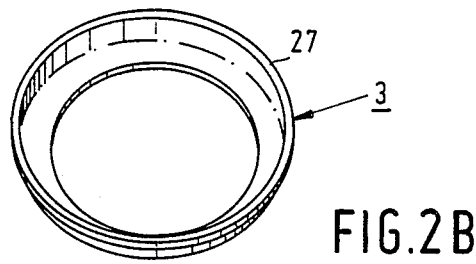
Figure 2C:
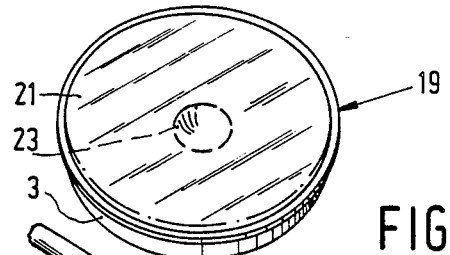

FIGS. 2A, 2B and 2C show in perspective view the glass preform 1, the ring 3 and the manufactured composite lens element 19. In this embodiment, the ring 3 is provided with an annular flange 27.

Figure 3:
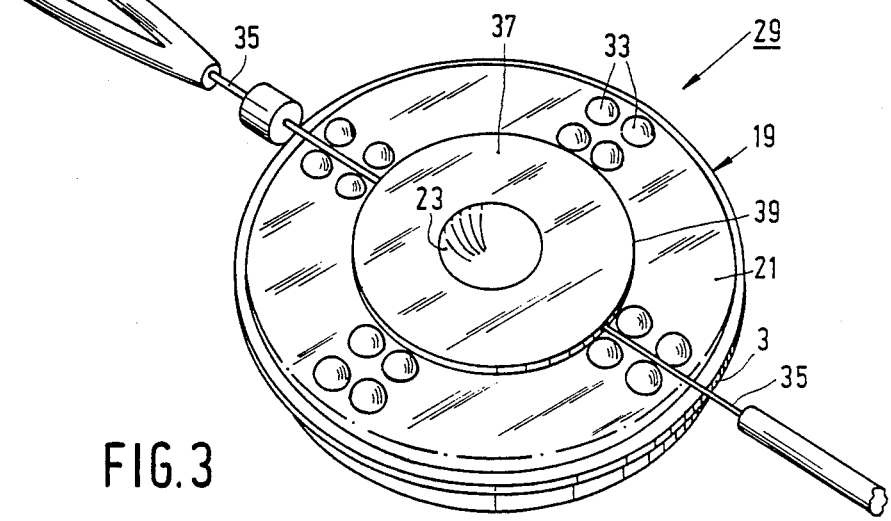
FIG. 3 shows a complete planar geodesic lens.

FIG. 3 shows a geodesic wave guide lens 29, comprising a composite lens element 19 manufactured by the method according to the invention. In the manner already described, a light-conducting layer is applied to the glass lens 21. The side of the glass lens 21 with the geodesic structure 23 is provided with embossed parts 33, which serve as guide elements for optical fibres 35. Further, the same side of the glass lens is provided with a convex disk-shaped profile 37 with an upright edge 39 engaged by the end faces of the fibres 35. The fibres are fixed to the glass lens 21 by means of glue. The coupling of the fibres 35 with the upright edge 39 of the profile 37 can be improved by eliminating at the coupling area the curvature of the upright edge 39 by means of a grinding or sawing operation and by providing a coupling surface located in one vertical plane.

By the method according to the invention, lens elements were moulded from the glasses mentioned hereinafter with the use of indicated parameters and dimensions.

Embodiment 1

A disk-shaped glass perform consisted of BK 7 glass (optical glass of Schott) and had a diameter of 22 mm and a thickness of 4 mm. As a holder use was made of a nickel ring having an inner diameter of 22 mm and a height of 3.7 mm. The supporting ring of Cr steel had an inner diameter of 23 mm. The upper die having a diameter of 26 mm was made of quartz glass and the lower die also having a diameter of 26 mm was made of Ni-Cr steel. Both dies were profiled in the manner described above. The glass preform, the holder and the supporting ring were heated to 875° C. for 2.5 minutes. At this temperature, the said glass has a viscosity of $10^{5.4}$ dPa. The two moulding dies were heated to a temperature of 460° C. The moulding step was carried out with a pressure force of 120 N for 7 seconds. For providing a light conducting layer the lens element thus formed, provided with a geodesic structure and intended to be used as a substrate for a geodesic wave guide lens, was then immersed for 6 hours in a bath of molten silver nitrate at a temperature of 325° C., as a result of which a planar geodesic lens was formed due to exchange of Na ions for Ag ions.

Embodiment 2

The glass preform consisted of a disk of F2 glass (optical glass of Schott) provided with a film of a glass having a higher refractive index, i.e. SF 53 glass (optical glass of Schott). The film having a thickness of 50 μm acts as a light-conducting layer. The glass preform had a diameter of 22 mm and a thickness of 4 mm. The holder and the supporting ring were identical to those of the first embodiment. The two dies had a diameter of 26 mm, were both made of Ni-Cr steel and were profiled in the manner already described above. For carrying out the moulding process, the preform, the holder and the supporting ring were heated to 750° C. The temperature of the two dies amounted to 460° C. A pressure force of 120 N was exerted for 14 seconds.

In practice, the products of the same series have the same thickness, starting from identical glass preforms. However, the thickness of the products is not essential; the accuracy of the shape and the surface quality of the pressed profile are of essential importance. The products had an optically smooth surface and an accuracy to shape of less than 2 $\mu$m.

What is claimed is:

1. A method of manufacturing lens elements having a glass lens and a metal holder comprising the steps:
   a. positioning a glass preform in a holder, said holder being a ring dimensioned to laterally surround said glass preform and having a height slightly less than the thickness of said preform;
   b. heating said glass preform and said holder to a predetermined temperature suitable for moulding of said glass;
   c. positioning said heated preform and holder between the dies of a mould, said dies being heated and having respective profiles corresponding to the profile of the glass lens to be formed;
   d. moving said two dies relative to each other, closing the distance therebetween;
   e. compressing said heated glass preform between said dies and forming said die profiles into said glass preform to form said lens said ring laterally expanding by the pressure created in said glass preform caused by said compression and being limited in lateral expansion by a surrounding ring;
   f. terminating said die motion at a predetermined position whereby a small gap remains between at least one of said dies and said holder, a quasi-closed moulding cavity having said small gap existing at completion of said die motion, a quantity of glass from said preform being pressed away through said gap during said moulding operation without loss of pressure in said moulding cavity; and
   g. cooling the obtained composite lens element comprising a glass lens and holder.

2. A method as claimed in claim 1 for manufacturing planar lens elements, wherein said glass preform is disk-shaped, said ring includes a cylindrical wall portion, one of said mould dies includes a geodesic profile, said glass preform being moulded within said ring to form said composite planar lens element including a disk-shaped glass lens having on one side a geodesic structure and a ring enclosing said glass lens.

3. A method as claimed in claim 1, wherein said first ring is made of nickel.

4. A method as claimed in claim 1, wherein said the dies are made of quartz glass at least on the moulding surface.

5. A method as claimed in claim 2, wherein the other die has a convex profile, the other side of the glass lens remote from the geodesic structure being provided with a concave profile.

6. A method as claimed in claim 2, wherein during moulding guide elements are formed on the side of the glass lens provided with the geodesic structure.

* * * * *